United States Patent
Lee et al.

(10) Patent No.: US 11,942,750 B2
(45) Date of Patent: Mar. 26, 2024

(54) LASER INSPECTION SYSTEM

(71) Applicant: INDUSTRIAL TECHNOLOGY RESEARCH INSTITUTE, Hsinchu (TW)

(72) Inventors: Yi-Chi Lee, Hsinchu (TW); Hsin-Chia Su, Hsinchu (TW); Shih-Ting Lin, Hsinchu (TW); Yu-Cheng Song, Hsinchu (TW); Fu-Shun Ho, Hsinchu (TW); Chih-Chun Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 356 days.

(21) Appl. No.: 17/101,081

(22) Filed: Nov. 23, 2020

(65) Prior Publication Data

US 2022/0131326 A1 Apr. 28, 2022

(30) Foreign Application Priority Data

Oct. 27, 2020 (TW) .................................. 109137339

(51) Int. Cl.
*H01S 3/00* (2006.01)
*G02B 6/293* (2006.01)
(Continued)

(52) U.S. Cl.
CPC ........ *H01S 3/0014* (2013.01); *G02B 6/29389* (2013.01); *H01S 3/06708* (2013.01); *H01S 3/1608* (2013.01)

(58) Field of Classification Search
CPC .... H01S 3/0014; H01S 3/1608; H01S 3/2383; H01S 3/06754
See application file for complete search history.

(56) References Cited

U.S. PATENT DOCUMENTS 5,245,690 A * 9/1993 Aida .................... H01S 3/13013
   385/32
6,167,181 A * 12/2000 Fukaishi ............. H01S 3/06704
   359/341.1
(Continued)

FOREIGN PATENT DOCUMENTS

CN 103887708 6/2014
CN 109244816 1/2019
(Continued)

OTHER PUBLICATIONS

Svalgaard, et al. "Stability of short, single-mode erbium-doped fiber lasers", Jul. 20, 1997, vol. 36, No. 21, Applied Optics, pp. 4999-5005.
(Continued)

*Primary Examiner* — Michael Carter
(74) *Attorney, Agent, or Firm* — Amin, Turocy & Watson, LLP

(57) ABSTRACT

A laser inspection system is provided. A laser source emits a laser with a first spectrum and the laser is transmitted by a first optical fiber. A gain optical fiber doped with special ions is connected to the first optical fiber, and a light detector is provided around the gain optical fiber. When the laser with the first spectrum passes through the gain optical fiber, the gain optical fiber absorbs part of the energy level of the laser with the first spectrum, so that the laser with the first spectrum is converted to generate light with a second spectrum based on the frequency conversion phenomenon. The light detector detects the intensity of the light with the second spectrum, so that the power of the laser source can be obtained.

7 Claims, 7 Drawing Sheets

(51) Int. Cl.
*H01S 3/067* (2006.01)
*H01S 3/16* (2006.01)

(56) References Cited

U.S. PATENT DOCUMENTS

| | | | |
|---|---|---|---|
| 6,337,939 B1 * | 1/2002 | Aspell | H01S 5/0687 |
| | | | 372/6 |
| 7,680,170 B2 | 3/2010 | Hu et al. | |
| 7,773,640 B2 | 8/2010 | Hu et al. | |
| 9,534,952 B2 | 1/2017 | Creeden et al. | |
| 2002/0126479 A1 | 9/2002 | Zhai et al. | |
| 2006/0158718 A1 * | 7/2006 | Pan | G02B 6/424 |
| | | | 359/341.1 |
| 2007/0189338 A1 * | 8/2007 | Seelert | H01S 3/2383 |
| | | | 372/6 |
| 2008/0273570 A1 * | 11/2008 | Moench | H01S 3/09415 |
| | | | 372/71 |
| 2017/0051884 A1 | 2/2017 | Raring et al. | |
| 2018/0236605 A1 | 8/2018 | Finuf et al. | |

FOREIGN PATENT DOCUMENTS

| | | |
|---|---|---|
| CN | 208603352 | 3/2019 |
| JP | 2014-142215 | 8/2014 |
| TW | 196251 | 12/1992 |
| TW | I337267 | 2/2011 |
| TW | I344736 | 7/2011 |
| TW | I380542 | 12/2012 |
| TW | I448753 | 8/2014 |
| TW | I493157 | 7/2015 |
| TW | I603073 | 10/2017 |
| TW | 201743049 | 12/2017 |
| TW | 201832859 | 9/2018 |
| TW | I659583 | 5/2019 |
| TW | M598197 | 7/2020 |

OTHER PUBLICATIONS

Chen, et al. "Beam quality analysis and optimization for 10 KW-level spectral beam combination system", Optics Communications 444 (2019) 45-55.

Yan, et al. "3.1 Kw monolithic MOPA configuration fibre laser bidirectionally pumped by non-wavelength-stabilized laser diodes", Laser Phys. Lett. 14 (2017) 080001.

Taiwanese Office Action for Taiwanese Patent Application No. 109137339 dated Jul. 6, 2021.

* cited by examiner

LASER INSPECTION SYSTEM

BACKGROUND

1. Technical Field

The present disclosure relates to a laser inspection technology, and more particularly, to a laser inspection system that detects the power of a laser source in real time.

2. Description of Related Art

Optical fibers usually use media to form pipelines and achieve light transmission through total reflection. With the demand for long-distance transmission, optical fibers continue to develop, and their applications are not limited to communications. Lasers transmitted through optical fibers are also common, but at the same time, have brought about many issues.

In optical fiber transmission, the primary consideration is that the transmission loss should be as small as possible. Therefore, many manufacturers are committed to the monitoring of transmission performance of optical fibers. In addition to measuring and improving the optical transmission performance, different mechanisms have also been adopted to improve the efficiency of the laser sources. For example, through a stacked package, optical elements and beam combiners are coupled to several laser source arrays to achieve high brightness, or spatial mixing is used to couple the laser source into light of high intensity, so as to increase transmission power. However, the foregoing methods increase the transmission power by either stacking or integration, but the monitoring of the laser sources is not being considered. That is, the foregoing methods improve efficiency through the combinations of multiple components, but they do not monitor the transmission power of the laser sources. This not only means that the cost is high, but also the power of the laser sources is unknown, let alone improved.

Therefore, there is a need for an inspection mechanism for the power of laser sources without the need to install a large number of components or a complex structure.

SUMMARY

In view of the aforementioned shortcomings of the prior art, the present disclosure provides a laser inspection technique that achieves monitoring of laser power by exploiting the properties of the laser of a laser source and optical fibers without the need to install a large number of components or a complex structure.

The present disclosure provides a laser inspection system, which may include: a laser source emitting a laser with a first spectrum, and the laser with the first spectrum being transmitted by a first optical fiber; a gain optical fiber connected with the first optical fiber; and a light detector provided at the gain optical fiber, wherein when the laser with the first spectrum passes through the gain optical fiber, part of energy level of the laser with the first spectrum is absorbed by the gain optical fiber, such that the laser with the first spectrum is converted to generate a light with a second spectrum, and an intensity of the light with the second spectrum is detected by the light detector.

The present disclosure provides a laser inspection system, which may include: a plurality of laser sources emitting lasers with a first spectrum; at least one combiner connected with the plurality of laser sources via a plurality of first optical fibers, the at least one combiner combining the first optical fibers together; a laser exiting portion connected with the at least one combiner via at least one second optical fiber; a plurality of gain optical fibers disposed at each of the plurality of first optical fibers and at the at least one second optical fiber, respectively; and a plurality of light detectors disposed at the plurality of gain optical fibers, wherein when the lasers with the first spectrum pass through the plurality of gain optical fibers, parts of energy levels of the lasers with the first spectrum are absorbed by the gain optical fibers, such that the lasers with the first spectrum are converted to generate lights with a second spectrum, and intensities of the lights with the second spectrum are detected by the plurality of light detectors.

In summary of the above, the present disclosure provides a laser inspection system that allows part of the energy level of the laser light to be absorbed by the gain optical fiber, such that the laser light is converted to generate fluorescent signals. Real-time monitoring of the power of the laser source can be achieved by monitoring the intensity of the fluorescent signals. The gain optical fiber is a gain optical fiber doped with special ions, wherein part of the energy level of the laser light is absorbed by the special ions to generate other light. The intensity of the other light is detected to infer the power of the laser source. The present disclosure allows the power of the laser source to be inferred by simply connecting a gain optical fiber with the laser source and detecting the light signals at the gain optical fiber, eliminating the need for other components. As a result, the present disclosure offers the advantages of low cost and real-time inspection.

DETAILED DESCRIPTION

The technical content of the present disclosure are illustrated using the following specific implementations. One of ordinary skill in the art can readily appreciate advantages and technical effects of the present disclosure based on the disclosed content herein. However, the present disclosure can be implemented or applied using other different specific implementations.

Figure 1:
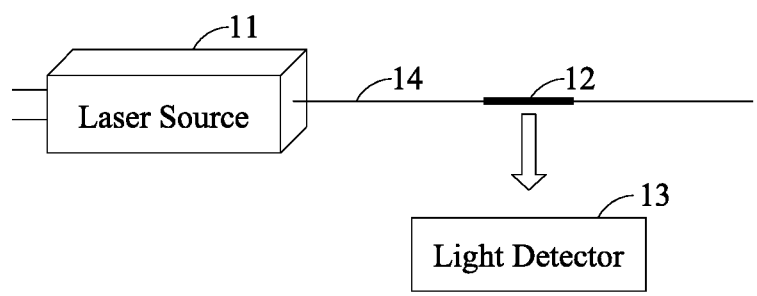
FIG. 1 is a schematic diagram depicting the architecture of a laser inspection system in accordance with the present disclosure.

FIG. 1 is a schematic diagram depicting the architecture of a laser inspection system in accordance with the present disclosure. The laser inspection system of the present disclosure is used for inspecting the power of a laser source by exploiting a physical phenomenon between special ions in a gain optical fiber disposed in the transmission path of a laser light with the laser light, thereby achieving monitoring of the power of the laser source. As shown, the laser inspection system 1 of the present disclosure includes a laser source 11, a gain optical fiber 12 and a light detector 13.

The laser source 11 transmits a laser with a first spectrum. The laser with the first spectrum can be transmitted by a first optical fiber 14.

The gain optical fiber 12 is connected to the first optical fiber 14, that is, after the laser with the first spectrum travels through the first optical fiber 14, it enters into the gain optical fiber 12. The said connecting method can be welding. In an embodiment, the gain optical fiber 12 can be provided at the first optical fiber 14 by fusion splicing, for example, a section of gain optical fiber 12 can be joined with the first optical fiber 14.

The light detector 13 can be disposed at the gain optical fiber 12, wherein when the laser with the first spectrum passes through the gain optical fiber 12, the gain optical fiber 12 absorbs part of the energy level of the laser with the first spectrum, so that the laser with the first spectrum is converted to generate light with a second spectrum. The light detector 13 detects the intensity of the light with the second spectrum. More specifically, special ions inside the gain optical fiber 12 is capable of absorbing part of the energy level of the laser, and the light with the second spectrum is thus generated through, for example, down conversion. The present disclosure employs the light detector 13 to detect the intensity of the light with the second spectrum in order to obtain the power of the laser with the first spectrum.

In an embodiment, the gain optical fiber 12 is an optical fiber doped with special ions, wherein the special ions are erbium, that is, the gain optical fiber is a gain optical fiber doped with erbium. In addition, the laser with the first spectrum is a blue laser with a wavelength between 430 nm and 460 nm, and the light with the second spectrum is a green light with a wavelength between 520 nm and 550 nm.

Figure 2:
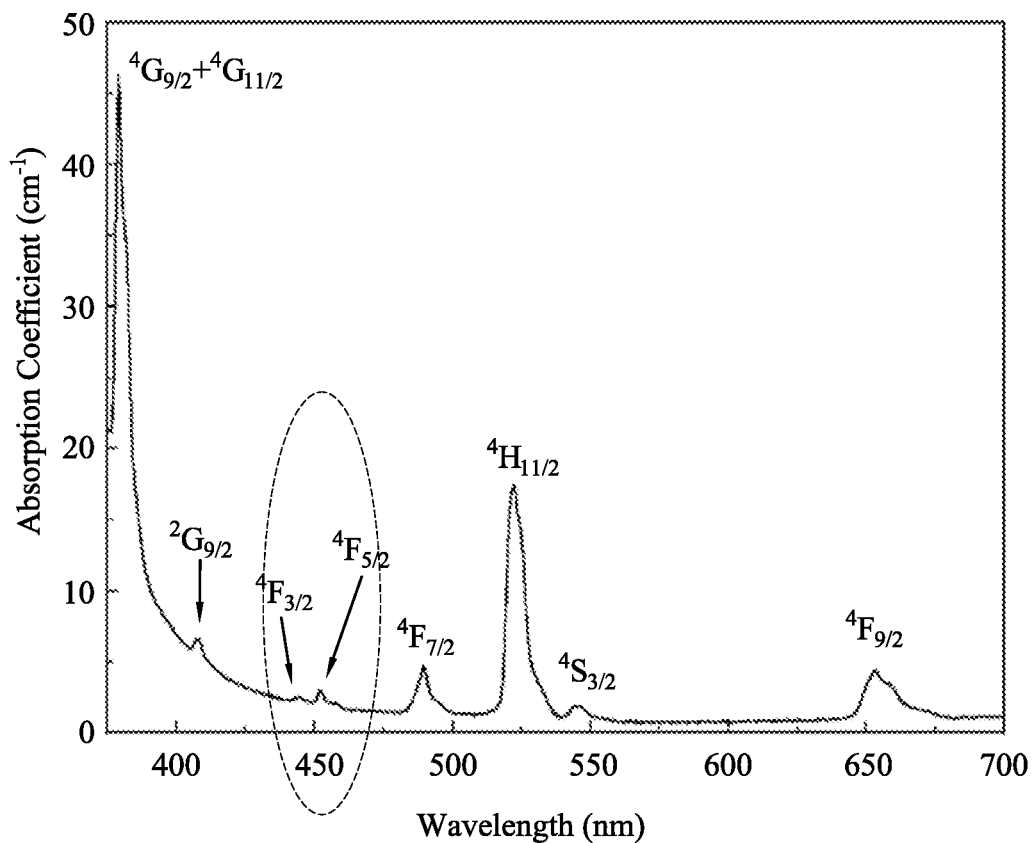
FIG. 2 is a graph depicting the absorption spectrum of erbium ions in a gain optical fiber of the laser inspection system in accordance with the present disclosure.

The inventors through research have discovered erbium ions can absorb a part of the energy level of blue light. More specifically, FIG. 2 is a graph depicting the absorption spectrum of erbium ions. As shown in the absorption spectrum of erbium ions, blue light with wavelengths between 443 nm and 450 nm can be absorbed by erbium ions, and the absorption of part of the energy level of blue light can be called "down conversion," and green fluorescent light can be generated. The present disclosure detects green fluorescent light signals to infer the power of the blue laser source.

Figure 3:
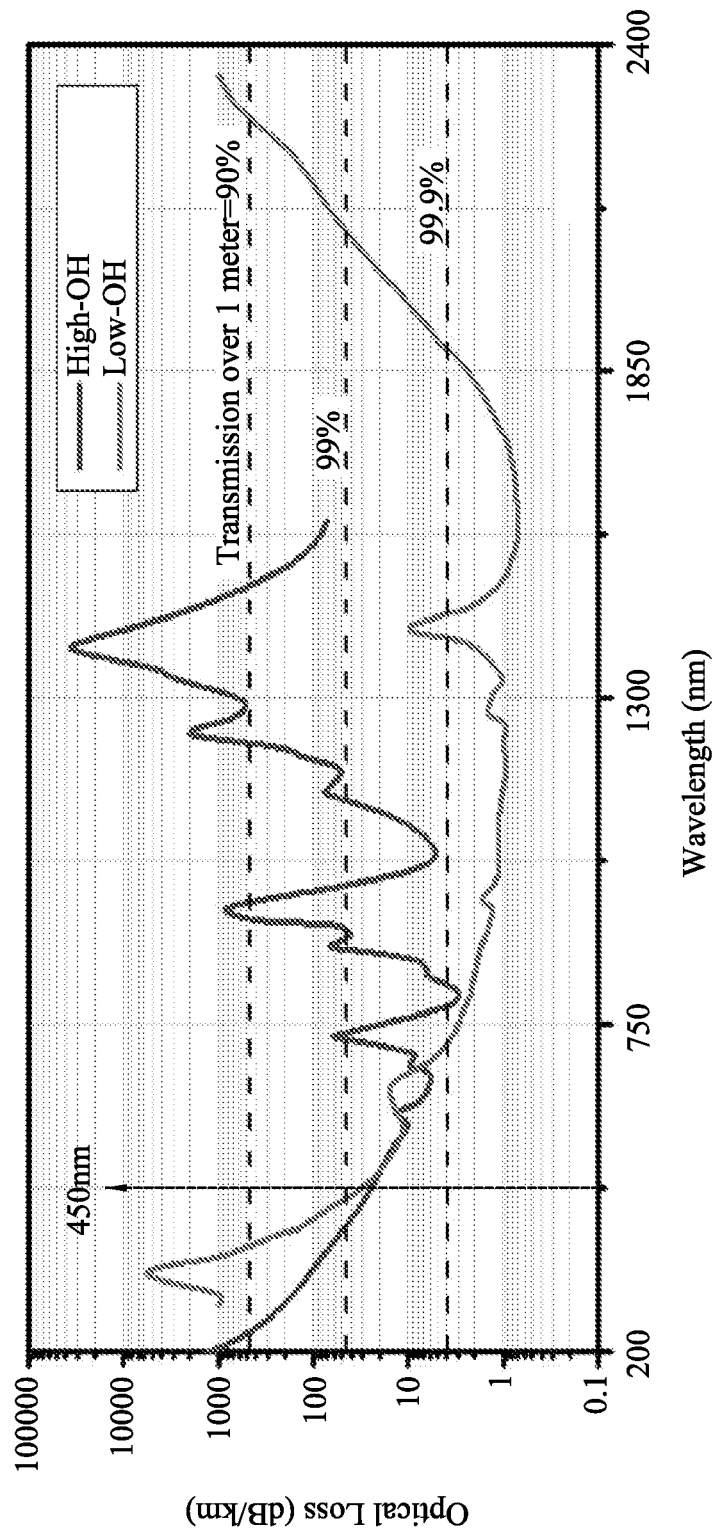
FIG. 3 is a graph comparing the attenuation coefficients of different types of gain optical fibers of the laser inspection system in accordance with the present disclosure.

In addition, different types of optical fibers also influence the attenuation of the light to different extents. More specifically, FIG. 3 is a graph comparing the attenuation coefficients of different types of gain optical fibers of the present disclosure. As can be seen from the graph, the attenuation coefficients of an optical fiber with a high concentration of hydroxyl groups (High-OH) and an optical fiber with a low concentration of hydroxyl groups (Low-OH) vary with the wavelengths, wherein at a wavelength of 450 nm where blue light is, the attenuation rate of the high-OH optical fiber is significantly better than the low-OH optical fiber, that is, the high-OH optical fiber has a smaller attenuation rate than the low-OH optical fiber. Therefore, in order to reduce the effect of attenuation of the optical fiber on the blue laser, the first optical fiber 14 of the present disclosure selects a high-OH optical fiber for transmission of the blue laser, since its attenuation rate has a low sensitivity to wavelength, the attenuation effect on the blue laser can be reduced.

Figure 4:
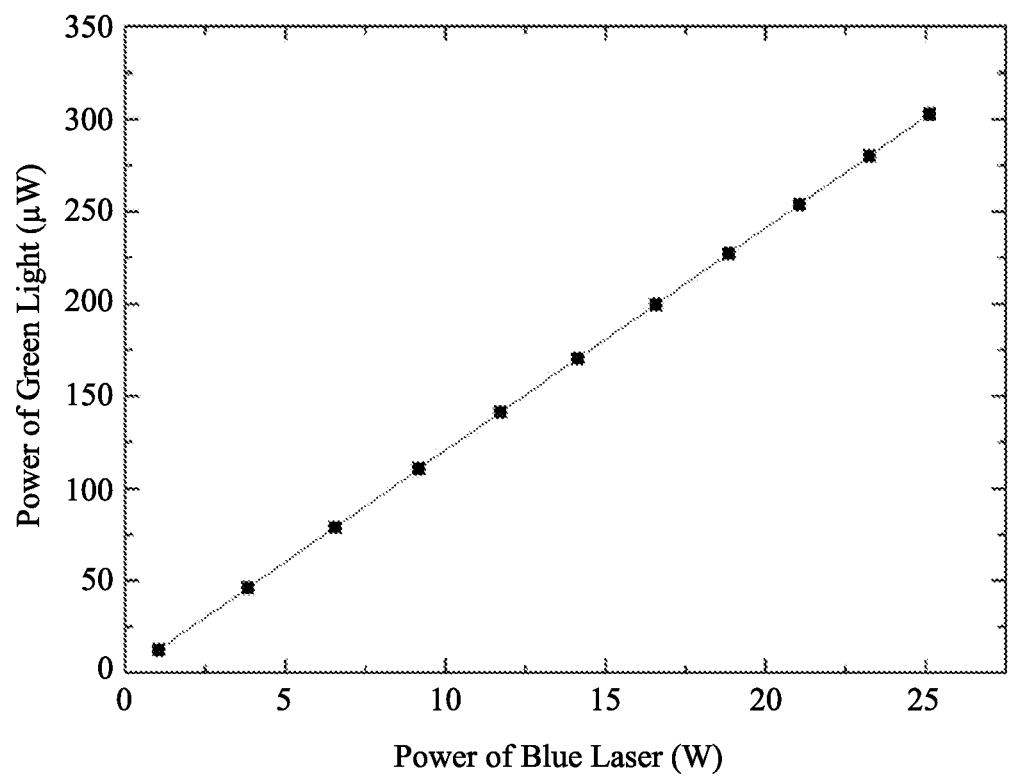
FIG. 4 is a graph depicting the power of the laser source in the laser inspection system of the present disclosure versus the power of the fluorescence generated.

FIG. 4 is a graph depicting the power of the laser source in the laser inspection system of the present disclosure versus the power of the fluorescence generated. As shown, in the range of 0-25 watts (W), the power of the blue laser and the power of the green fluorescent light exhibit a linear relationship. Therefore, by detecting the power of the green fluorescent light, the present disclosure can derive the power of the blue laser, thereby achieving the objective of monitoring the blue laser.

Figure 5:
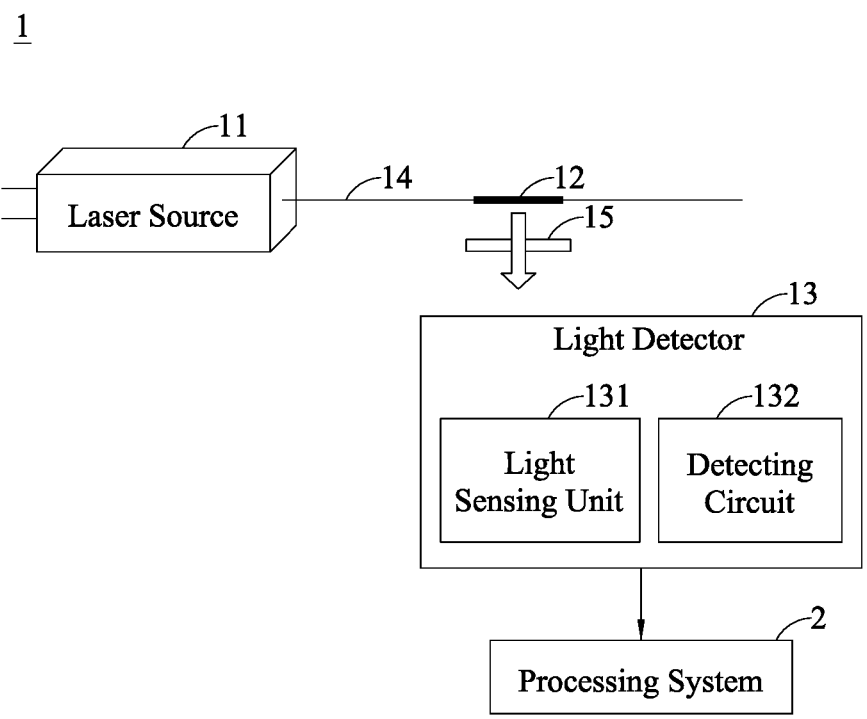
FIG. 5 is a schematic diagram depicting the architecture of a laser inspection system in accordance with another embodiment of the present disclosure.

FIG. 5 is a schematic diagram depicting the architecture of a laser inspection system in accordance with another embodiment of the present disclosure. As shown, the laser source 11, the gain optical fiber 12 and the first optical fiber 14 in the laser inspection system 1 is similar to those described with respect to FIG. 1, and will not be repeated. In an embodiment, the light detector 13 further includes a light sensing unit 131 and a detecting circuit 132 connected to the light sensing unit 131.

The light sensing unit 131 is used for receiving the light with the second spectrum emitted from the gain optical fiber 12. The detecting circuit 132 is used for determining the intensity of the light with the second spectrum. More specifically, when the laser emitted by the laser source 11 travels through the gain optical fiber 12, the special ions inside the gain optical fiber 12 absorbs part of the energy level of the laser source 11, and other fluorescence is created through down conversion. The light detector 13 then detects the intensity of the fluorescence, wherein the light sensing unit 131 receives the fluorescence from the gain optical fiber 12, and the detecting circuit 132 determines the intensity of the fluorescence. In an embodiment, the light sensing unit 131 can be a light sensor.

In an embodiment, a band pass filter 15 is provided between the gain optical fiber 12 and the light detector 13. Simply put, the band pass filter 15 is a device that only allows signals of a certain frequency to pass through while suppressing signals of the rest of the frequencies. Its function is to allow waves in a specific frequency band to pass through while blocking those in other frequency bands. Thus, the present disclosure uses the band pass filter 15 to filter waves, so as to allow passage of green light to be subsequently detected by the light detector 13.

In another embodiment, the light detector 13 is connected with a processing system 2. The processing system 2 can determine whether a warning message should be issued based on the intensity of the light with the second spectrum generated by the gain optical fiber 12. In other words, the light detector 13 can be connected to the processing system 2, so that the intensity of the light with the second spectrum (i.e., the fluorescence) obtained by the light detector 13 can be sent to the processing system 2 for data storage, and a warning unit inside the processing system 2 can then determine whether the power of the laser source 11 is satisfactory. If the power of the laser source 11 is not satisfactory, then a warning message can be issued and sent to the management end.

It can be understood from the above that the blue light optical-fiber coupler of present disclosure is designed using an optical fiber with low attenuation, which is in contrast to the existing commercially available coupling mechanisms. For example, an optical fiber specially doped with erbium is fusion welded to the blue laser, the erbium ions in the optical fiber will absorb blue light at a wavelength of about 450 nm to generate a green light at a wavelength of about 543 nm through down conversion phenomenon of the energy level.

In addition, the inspection concept of the present disclosure is also applicable to in-line power inspection for high-power seed ends and coupler output ends.

There is a myriad of processing applications of blue high-power laser sources. For example, in the processing of 5G heat dissipation materials, solder joints on circuit boards are increasingly become smaller, and it is hoped that a good laser source can help improve the yield, and a blue high-power laser source is a preferred choice. In addition, in the welding of copper (Cu) metal sheets, the absorption of light in the blue wavelength range by copper metals is ten times greater than the traditional laser at a wavelength of 1064 nm, which can effectively improve the product processing quality and efficiency. In addition, in terms of improvements in the manufacturing process of inductive components, if a blue high-power laser source can be used for direct welding, the accuracy will be improved and no solder is required, which prevents pollution caused by solder materials currently used. The above description shows that the application of blue laser sources will increase rapidly. Therefore, the inspection method of blue laser sources disclosed in the present disclosure will help users to have better monitoring mechanisms in the future.

Figure 6:
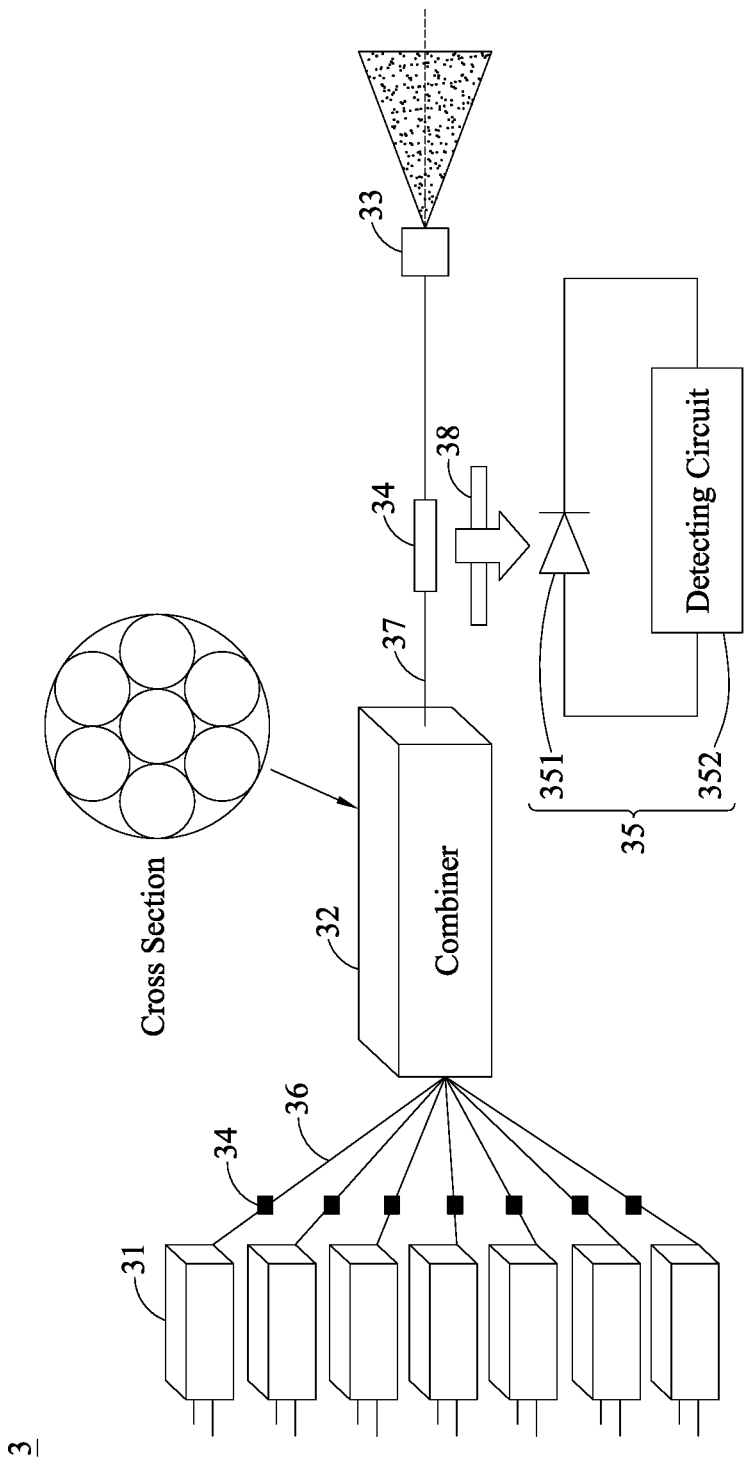
FIG. 6 is a schematic diagram depicting the architecture of a laser inspection system in accordance with another embodiment of the present disclosure.

FIG. 6 is a schematic diagram depicting the architecture of a laser inspection system in accordance with another embodiment of the present disclosure. In an embodiment, instead of monitoring a single laser source, a plurality of laser sources can be simultaneously monitored. As shown, a laser inspection system 3 includes a plurality of laser sources 31, at least one combiner 32, a laser exiting portion 33, a plurality of gain optical fibers 34 and a plurality of light detectors 35.

The plurality of laser sources 31 are capable of emitting lasers with a first spectrum. The at least one combiner 32 is connected with the plurality of laser sources 31 via a plurality of first optical fibers 36. The at least one combiner 32 combines the plurality of first optical fibers 36 together. The laser exiting portion 33 is connected to the at least one combiner 32 via at least one second optical fiber 37.

A plurality of gain optical fibers 34 are disposed at each of the plurality of first optical fibers 36 and the at least one second optical fiber 37, respectively, and a plurality of light detectors 35 are disposed at the plurality of gain optical fibers 34 (only one is shown). When the lasers with the first spectrum pass through the plurality of gain optical fibers 34, the plurality of gain optical fibers 34 absorb parts of the energy levels of the lasers with the first spectrum, and the lasers with the first spectrum are converted to generate lights with a second spectrum. The intensities of the lights with the second spectrum are detected by the plurality of light detectors 35.

In an embodiment, the plurality of gain optical fibers 34 are doped with erbium, that is, the plurality of gain optical fibers 34 are gain optical fibers doped with erbium ions. In addition, the lasers with the first spectrum are blue lasers with wavelengths between 430 nm and 460 nm, and the lights with the second spectrum are green lights with wavelengths between 520 nm and 550 nm. Furthermore, the first optical fibers 36 and the second optical fiber 37 are high-OH optical fibers.

As mentioned before, owing to the fact that the erbium ions can absorb part of the energy level of blue light, that is, blue light with a wavelength between 443 nm and 450 nm can be absorbed by the erbium ions. The absorption of part of the energy level of blue light (or down frequency phenomenon) can cause green fluorescence to be generated. Based on the linear relationship between the power of blue laser light and the power of green fluorescent light in the range of 0-25 W, the present disclosure is able to infer the power of the blue laser source by detecting the green fluorescent light signals.

In contrast to the embodiment described with respect to FIG. 1, the embodiment of FIG. 6 adopts the combiner 32 to combine the plurality of laser sources 31. As shown, seven blue laser sources 31 can be combined together using one combiner 32, and the combiner 32 is connected with the laser exiting portion 33. A first optical fiber 36 is provided between each of the blue laser sources 31 and the combiner 32, and a second optical fiber 37 is provided between the combiner 32 and the laser exiting portion 33. The gain optical fibers 34 can be fused at the first optical fibers 36 and the second optical fiber 37, and the plurality of light detectors 35 can be provided at the respective gain optical fibers 34. As described earlier, when the blue lasers with the first spectrum pass through the gain optical fibers 34, parts of the energy levels of the blue lasers can be absorbed by the erbium ions in the gain optical fibers 34 to generate green fluorescence, which can then be detected by the light detector 35 provided at each of the gain optical fibers 34. The power of the blue lasers can be inferred based on the intensities of the respective green fluorescence.

In the case that a plurality of combiners 32 are used for combing different groups of laser sources 31, the optical fibers following the combiners 32 can be partially or entirely combined together. Inspection can take place as long as there is a gain optical fiber 34 fused in place; the principle of the inspection is the same and will not be described in details.

In an embodiment, each of the light detectors 35 can include a light sensing unit 351 and a detecting circuit 352 connected to the light sensing unit 351. The light sensing unit 351 is used for receiving the light with the second spectrum emitted by the respective gain optical fiber, and the detecting circuit 352 is used for determining the intensity of the light with the second spectrum. Each of the light detectors 35 can be subsequently connected to a processing system (not shown) to store and analyze data from the light detector 35 and to issue warnings. Moreover, a band pass filter 38 can be provided between each of the gain optical fibers 34 and the respective light detector 35 to allow the green light that is to be detected by the light detector 35 to pass through.

Figure 7:
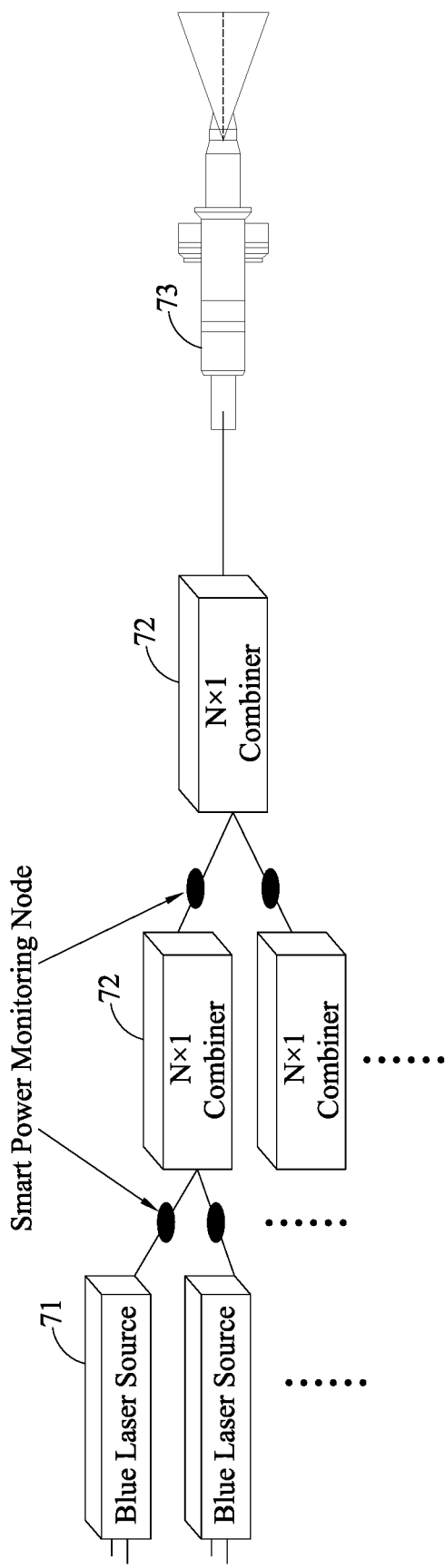
FIG. 7 is a schematic diagram depicting a specific implementation of a laser inspection system in accordance with the present disclosure.

FIG. 7 is a schematic diagram depicting a specific implementation of a laser inspection system in accordance with the present disclosure. As shown, a plurality of blue laser sources 71 can be combined by a plurality of combiners 72. Combiners 72 are N×1 combiners, wherein N is equal to or greater than 2. Optical fibers at the output ends of the plurality of combiners 72 can be combined together by a further combiner 72 before being outputted by a laser exiting portion 73. A smart monitoring node can be located at each optical fiber, that is, through fusion splicing, a gain optical fiber doped with special ions can be fused with each optical fiber. More specifically, each optical fiber is cut and a gain optical fiber is fusion spliced between the optical fiber, such that when a blue laser from a blue laser source 71 passes through the gain optical fiber, blue light is absorbed by the erbium ions, and green fluorescence is generated through down conversion. Finally, the intensity of the green fluorescence is detected to infer the power of the blue laser source 71. It can be understood from the above that, by providing a smart monitoring node at each of the optical fibers, inspection can be carried out by the respective light detectors in these nodes, and data can then be sent to a processing system (e.g., in a server) for storage and analysis, and warnings can be issued if required.

The present disclosure combines a gain optical fiber doped with special ions with a high-power optical fiber blue laser source. It is found that part of the energy level in the absorption spectrum of the gain optical fiber is in the blue laser wavelength range and can be absorbed, and green fluorescence can be generated as a result of the down conversion of the energy level of the ions after absorption. Accordingly, by monitoring the intensity of the fluorescence, the application of in-line monitoring of the high-power blue laser source can be achieved. It is also possible that in the future, in conjunction with system firmware, data can be uploaded to the cloud to realize a smart optical fiber system.

In addition, the present disclosure is an all-optical-fiber transmission, which has a small energy loss and good laser coaxiality. By detecting the intensity of the green fluorescence, the power of the blue laser source can be obtained in real time, thus meeting the needs for real-time inspection.

In conclusion, in the laser inspection system proposed by the present disclosure, real-time monitoring can be achieved by coupling a laser seed source with an optical coupler made of an optical fiber in conjunction with another optical fiber doped with erbium that emits green fluorescence. In other words, generating green fluorescence by a gain optical fiber directly absorbing blue light prevents misjudgments caused by blue light leaking from the optical fiber getting scattered by the environment. Compared to the existing upper anti-reflective UV adhesive process technology, production efficiency can be improved, and human labor and time can also be saved. Moreover, real-time smart cloud capability can be incorporated into the system described herein to allow real-time feedback and recording of the operations of the laser.

The above embodiments are set forth to illustrate the principles of the present disclosure, and should not be interpreted as to limit the present disclosure in any way. The above embodiments can be modified by one of ordinary skill in the art without departing from the scope of the present disclosure as defined in the appended claims.

What is claimed is:

1. A laser inspection system, comprising:
   a plurality of laser sources emitting lasers with a first spectrum;
   at least one combiner connected with the plurality of laser sources via a plurality of first optical fibers, the at least one combiner combining the first optical fibers together;
   a laser exiting portion connected with the at least one combiner via at least one second optical fiber;
   a plurality of gain optical fibers disposed at each of the plurality of first optical fibers and at the at least one second optical fiber, respectively; and
   a plurality of light detectors disposed at the plurality of gain optical fibers,
   wherein when the lasers with the first spectrum pass through the plurality of gain optical fibers, parts of energy levels of the lasers with the first spectrum are absorbed by the gain optical fibers, such that the lasers with the first spectrum are converted to generate lights with a second spectrum, and intensities of the lights with the second spectrum are detected by the plurality of light detectors.

2. The laser inspection system of claim 1, wherein the plurality of gain optical fibers are doped with erbium.

3. The laser inspection system of claim 1, wherein the lasers with the first spectrum are blue lasers.

4. The laser inspection system of claim 1, wherein the lights with the second spectrum are green lights.

5. The laser inspection system of claim 1, wherein each of the plurality of light detectors includes:
   a light sensing unit for receiving the light with the second spectrum emitted by the gain optical fiber; and
   a detecting circuit connected with the light sensing unit for determining the intensity of the light with the second spectrum.

6. The laser inspection system of claim 1, wherein a band pass filter is provided between each of the plurality of gain optical fibers and the corresponding light detector.

7. The laser inspection system of claim 1, further comprising a processing system connected with the plurality of light detectors for determining whether a warning message is to be issued based on the intensities of the lights with the second spectrum.

* * * * *